(12) United States Patent
Oyman (10) Patent No.: US 9,787,967 B2
(45) Date of Patent: Oct. 10, 2017

(54) SIGNALING THREE-DIMENSIONAL VIDEO INFORMATION IN COMMUNICATION NETWORKS

(71) Applicant: Intel Corporation, Santa Clara, CA (US)

(72) Inventor: Ozgur Oyman, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 26 days.

(21) Appl. No.: 14/581,756

(22) Filed: Dec. 23, 2014

(65) Prior Publication Data

US 2015/0113572 A1    Apr. 23, 2015

Related U.S. Application Data

(63) Continuation of application No. 13/626,767, filed on Sep. 25, 2012.
(Continued)

(51) Int. Cl.
*H04N 5/765* (2006.01)
*H04N 13/00* (2006.01)
(Continued)

(52) U.S. Cl.
CPC ......... *H04N 13/0059* (2013.01); *H04L 51/38* (2013.01); *H04L 65/1016* (2013.01); *H04L 65/1069* (2013.01); *H04L 65/4084* (2013.01); *H04L 65/4092* (2013.01); *H04L 65/60* (2013.01); *H04L 65/602* (2013.01); *H04L 65/607* (2013.01); *H04L 65/608* (2013.01); *H04L 65/80* (2013.01); *H04N 13/00* (2013.01); *H04N 21/2353* (2013.01); *H04N 21/234309* (2013.01); *H04N 21/2404* (2013.01);
(Continued)

(58) Field of Classification Search
None
See application file for complete search history.

(56) References Cited

U.S. PATENT DOCUMENTS

2002/0032751 A1    3/2002    Bharadwaj
2006/0248161 A1    11/2006   O'Brien et al.
(Continued)

FOREIGN PATENT DOCUMENTS

CN    102217322 A    10/2011
EP    2384011 A1     11/2011
(Continued)

OTHER PUBLICATIONS

ITU-T, "Advanced video coding for generic audiovisual services," H.264, Telecommunication Standardization Sector of ITU, International Communication Union, Series H: Audiovisual and Multimedia Systems Infrastructure of audiovisual services—Coding of moving video, Jan. 2012, pp. 365-374.
(Continued)

*Primary Examiner* — Heather Jones
(74) *Attorney, Agent, or Firm* — Schwabe, Williamson & Wyatt, P.C.

(57) ABSTRACT

Embodiments of the present disclosure describe devices, methods, computer-readable media and systems configurations for signaling stereoscopic three-dimensional video content capabilities of a device in a communications network. Other embodiments may be described and claimed.

10 Claims, 7 Drawing Sheets

Related U.S. Application Data (60) Provisional application No. 61/621,939, filed on Apr. 9, 2012, provisional application No. 61/679,627, filed on Aug. 3, 2012.

(51) Int. Cl.

| | | |
|---|---|---|
| *H04W 4/06* | (2009.01) | |
| *H04L 29/06* | (2006.01) | |
| *H04N 21/258* | (2011.01) | |
| *H04N 21/442* | (2011.01) | |
| *H04N 21/61* | (2011.01) | |
| *H04N 21/81* | (2011.01) | |
| *H04N 21/845* | (2011.01) | |
| *H04N 21/262* | (2011.01) | |
| *H04N 21/6437* | (2011.01) | |
| *H04L 12/58* | (2006.01) | |
| *H04N 21/643* | (2011.01) | |
| *H04W 4/14* | (2009.01) | |
| *H04W 60/04* | (2009.01) | |
| *H04W 76/02* | (2009.01) | |
| *H04N 21/235* | (2011.01) | |
| *H04N 21/2343* | (2011.01) | |
| *H04N 21/24* | (2011.01) | |
| *H04N 19/105* | (2014.01) | |
| *H04N 19/147* | (2014.01) | |
| *H04N 19/196* | (2014.01) | |
| *H04N 19/46* | (2014.01) | |
| *H04N 19/463* | (2014.01) | |
| *H04N 19/597* | (2014.01) | |
| *H04N 19/70* | (2014.01) | |
| *H04N 19/80* | (2014.01) | |

(52) U.S. Cl.
CPC . *H04N 21/25825* (2013.01); *H04N 21/25833* (2013.01); *H04N 21/26258* (2013.01); *H04N 21/4424* (2013.01); *H04N 21/44209* (2013.01); *H04N 21/6125* (2013.01); *H04N 21/6131* (2013.01); *H04N 21/643* (2013.01); *H04N 21/6437* (2013.01); *H04N 21/816* (2013.01); *H04N 21/8456* (2013.01); *H04W 4/06* (2013.01); *H04W 4/14* (2013.01); *H04W 60/04* (2013.01); *H04W 76/026* (2013.01); *H04N 19/105* (2014.11); *H04N 19/147* (2014.11); *H04N 19/196* (2014.11); *H04N 19/46* (2014.11); *H04N 19/463* (2014.11); *H04N 19/597* (2014.11); *H04N 19/70* (2014.11); *H04N 19/80* (2014.11)

(56) References Cited

U.S. PATENT DOCUMENTS

| | | |
|---|---|---|
| 2008/0151885 A1 | 6/2008 | Horn et al. |
| 2008/0183887 A1 | 7/2008 | Klemets |
| 2008/0228912 A1 | 9/2008 | Vedantham et al. |
| 2010/0134494 A1 | 6/2010 | Lim et al. |
| 2010/0165966 A1 | 7/2010 | Petion et al. |
| 2011/0032331 A1 | 2/2011 | Chen et al. |
| 2011/0040894 A1 | 2/2011 | Shrum, Jr. et al. |
| 2011/0043600 A1 | 2/2011 | Gopal et al. |
| 2011/0138018 A1 | 6/2011 | Raveendran et al. |
| 2012/0020413 A1 | 1/2012 | Chen et al. |
| 2012/0023249 A1 | 1/2012 | Chen et al. |
| 2012/0023518 A1 | 1/2012 | Meuninck et al. |
| 2012/0033037 A1* | 2/2012 | Chen .............. H04N 19/597 348/43 |
| 2012/0044324 A1 | 2/2012 | Lee et al. |
| 2012/0047542 A1 | 2/2012 | Lewis et al. |
| 2014/0300697 A1 | 10/2014 | de Haan |

FOREIGN PATENT DOCUMENTS

| | | |
|---|---|---|
| EP | 2424251 A2 | 2/2012 |
| EP | 2432232 A1 | 3/2012 |
| JP | 2004-282462 A | 10/2004 |
| JP | 2006-331199 A | 12/2006 |
| JP | 2011-108261 A | 6/2011 |
| JP | 2013-501475 A | 1/2013 |
| KR | 20090127246 A | 12/2009 |
| RU | 2277303 C2 | 5/2006 |
| RU | 2417548 C2 | 4/2011 |
| TW | I242382 B | 10/2005 |
| TW | I278242 B | 4/2007 |
| WO | 2004/093459 A1 | 10/2004 |
| WO | 2006/084503 A1 | 8/2006 |
| WO | 2007/013312 A1 | 2/2007 |
| WO | WO 2011/017473 A1 | 2/2011 |
| WO | WO 2011/035211 A2 | 3/2011 |
| WO | WO 2011/049517 A1 | 4/2011 |
| WO | 2011/084169 A1 | 7/2011 |
| WO | WO 2011/093677 A2 | 8/2011 |
| WO | WO 2011/159402 A1 | 12/2011 |
| WO | WO 2012/018951 A1 | 2/2012 |
| WO | 2013/155110 A1 | 10/2013 |

OTHER PUBLICATIONS

3GPP, "Technical Specification Group Services and System Aspects; Transparent end-to-end Packet-switched Streaming Service (PSS); Protocols and codecs (Release 11)," 3GPP TS 26.234 V11.0.0, Lte Advanced, Mar. 16, 2012, 169 pages.

3GPP, "Technical Specification Group Services and System Aspects; Transparent end-to-end Packet-switched Streaming Service (PSS); Progressive Download and Dynamic Adaptive Streaming over HTTP (3GP-DASH) (Release 10)," 3GPP TS 26.247 V10.1.0, Lte Advanced, Dec. 21, 2011, 113 pages.

3GPP, "Technical Specification Group Services and System Aspects; Multimedia Broadcast/Multicast Service (MBMS); Protocols and codecs (Release 11)," 3GPP TS 26.346 V11.0.0, Lte Advanced, Mar. 16, 2012, 163 pages.

3GPP, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.4.0, Lte Advanced, Dec. 21, 2011, 140 pages.

International Search Report and Written Opinion mailed Jul. 25, 2013 from International Application No. PCT/US2013/035839.

Vetro, "Frame Compatible Formats for 3D Video Distribution", Proceedings of 2010 17th IEEE International Conference on Image Processing, Sep. 26-29, 2010, Hong Kong, pp. 2405-2408.

Office Action issued in Spanish Patent Application No. 201330496, mailed on Feb. 26, 2014.

Office Action issued in Swedish Patent Application No. 1350444-4, mailed on Mar. 26, 2014.

Kim et al., "The adaptation of 3D stereoscopic video in MPEG-21 DIA," Elsevier, Signal Processing Image Communication, www.elsevier.com/locate/image, Science Direct, Signal Processing: Image Communication 18 (2003) 685-697, Sep. 1, 2003, South Korea, 13 pages.

Office Action issued Aug. 21, 2014 from Finnish Patent Application No. 20135313.

3GPP, "Universal Mobile Telecommunications System (UMTS); LTE; Transparent end-to-end Packet-switched Streaming Services (PSS); Protocols and codecs (3GPP TS 26.234 version 9.3.0 Release 9)," ETSI TS 126 234 V9.3.0 (Jun. 2010), 14 pages.

3GPP, "Technical Specification Group Services and System Aspects; Transparent end-to-end Packet-switched Streaming Service (PSS); Progressive Download and Dynamic Adaptive Streaming over HTTP (3GP-DASH) (Release 11)," 3GPP TS 26.247 V11.0.0 (Sep. 2012), Sep. 21, 2012, LTE Advanced, 112 pages.

3GPP, "Technical Specification Group Services and System Aspects; Multimedia Broadcast/Multicast Service (MBMS); Protocols and codecs (Release 11)," 3GPP TS 26.346 V11.1.0 (Jun. 2012), Jun. 29, 2012, LTE Advanced, 168 pages.

(56) References Cited

OTHER PUBLICATIONS

3GPP, "Technical Specification Group Services and System Aspects; IP Multimedia Subsystem (IMS) based Packet Switch Streaming (PSS) and Multimedia Broadcast/Multicast Service (MBMS) User Service; Protocols (Release 11)," 3GPP TS 26.237 V11.0.0 (Jun. 2012), Jun. 29, 2012, LTE Advanced, 142 pages.
International Preliminary Report on Patentability mailed Oct. 23, 2014 from International Application No. PCT/US2013/035839.
Office Action issued Oct. 10, 2014 in Spanish Patent Application No. 201330496.
Office Action issued Sep. 9, 2015 from Taiwan Patent Application No. 102111699.
Extended EP Search Report issued Jul. 17, 2015 from European Patent Application No. 13776049.2.
Office Action issued Aug. 21, 2015 from Australian Patent Application No. 2013246041.
Office Action issued Aug. 28, 2015 from Korean Patent Application No. 2014-7026843.
"3GPP, Technical Specification Group Services and System Aspects; Transparent end-to-end packet-switchedstreaming service (PSS); General description (Release 10)," 3GPP TS 26.233 V10.1.0 (Jun. 2011), Jun. 17, 2011, Lte Advanced, 16 pages.
Office Action issued Jul. 6, 2015 from U.S. Appl. No. 13/626,767.
Office Action issued Jan. 12, 2016 from Japanese Patent Application No. 2015-504772.
Office Action issued Nov. 10, 2015 from Russian Patent Application No. 2014138947.
Extended EP Search Report issued Dec. 10, 2015 from European Divisional Patent Application No. 151709003.
Office Action issued Nov. 13, 2015 from Canadian Patent Application No. 2,868,038.
Office Action issued Nov. 5, 2015 from Finnish Patent Application No. 20135313.
Office Action issued Feb. 2, 2015 in Swedish Patent Application No. 1350444-4.
Dutch Search Report mailed Nov. 17, 2014 for Dutch Patent Application No. 2010602, 8 pages.
3GPP, "3rd Generation Partnership Project; Technical Specification Group Services and Systems Aspects; Mobile stereoscopic 3D video (Release 11)," 3GPP Standard; 3GPP TR 26.905 v1.1.0, Mar. 16, 2012, 44 pages, France.
Search Report issued Jan. 16, 2015 from Belgium Application No. 2013/0244 (Google translated).
Office Action issued Mar. 25, 2015 from Taiwan Application No. 102111699.
Office Action issued Mar. 31, 2015 from Australian Application No. 2013246041.
Office Action issued Jul. 21, 2016 from Korean Divisional Application No. 2016-7014926, 5 pages.
Office Action issued Aug. 30, 2016 from Japanese Patent Application No. 2015-504772, 9 pages.
Office Action issued Jul. 1, 2016 from French Patent Application No. 1353180, 9 pages.
Office Action issued Aug. 24, 2016 from Taiwan Patent Application No. 102111699, 7 pages.
Office Action issued Mar. 11, 2016 from Mexican Patent Application No. MX/a2014/011579, 4 pages.
Office Action issued Mar. 30, 2016 from U.S. Appl. No. 13/626,767.
Office Action issued Feb. 10, 2017 from Finnish Patent Application No. 20135313, 4 pages.
Examination Report issued Mar. 16, 2017 from Australian Divisional Application No. 2016203175, 3 pages.
Office Action dated May 10, 2017 from Finnish Divisional Application No. 20175391, 1 page.
Office Action dated May 10, 2017 from Japanese Patent Application No. 2015-504772, 3 pages.
Office Action dated Jul. 13, 2017 from Russian Divisional Application No. 2016122772, 19 pages.
First Office Action dated Jun. 2, 2017 from Chinese Divisional Application No. 201610342932.3, 26 pages.

\* cited by examiner

Figure 3 a) vertical interleaving b) horizontal interleaving c) side-by-side d) top-bottom e) checker board

SIGNALING THREE-DIMENSIONAL VIDEO INFORMATION IN COMMUNICATION NETWORKS

CROSS REFERENCE TO RELATED APPLICATIONS

The present application is a continuation of U.S. patent application Ser. No. 13/626,767, filed Sep. 25, 2012, entitled "SIGNALING THREE-DIMENSIONAL VIDEO INFORMATION IN COMMUNICATION NETWORKS," which claims priority to U.S. Provisional Patent Application No. 61/621,939, filed Apr. 9, 2012, entitled "ADVANCED WIRELESS COMMUNICATION SYSTEMS AND TECHNIQUES" and U.S. Provisional Patent Application No. 61/679,627 filed Aug. 3, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of communications, and more particularly, to signaling three-dimensional video information in communication networks.

BACKGROUND

Three-dimensional (3-D) video offers a high-quality and immersive multimedia experience, which has only recently become feasible on consumer electronics and mobile platforms through advances in display technology, signal processing, transmission technology, and circuit design. It is currently being introduced to the home through various channels, including by Blu-ray Disc™, cable and satellite transmission, etc., as well as to mobile networks through 3-D enabled smartphones, etc. Concepts related to delivery of such content through wireless networks are being developed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 schematically illustrates a wireless communication network in accordance with various embodiments.

FIGS. 2*a-b* illustrate adaptation of streamed content and/or associated session description and metadata files in accordance with various embodiments.

FIG. 3 illustrates a setup of a streaming session in accordance with an embodiment.

FIG. 4 illustrates frame compatible packing formats in accordance with various embodiments.

FIG. 5 illustrates a method of signaling 3-D video device capabilities in accordance with various embodiments.

FIG. 6 illustrates a method of signaling 3-D video content in accordance with various embodiments.

FIG. 7 schematically depicts an example system in accordance with various embodiments.

DETAILED DESCRIPTION

Illustrative embodiments of the present disclosure include, but are not limited to, methods, systems, computer-readable media, and apparatuses for signaling stereoscopic three-dimensional video content capabilities of a client device in a communication network. Some embodiments of this invention in this context could be on methods, systems, computer-readable media, and apparatuses for signaling stereoscopic three-dimensional video content capabilities of a mobile device in a wireless communications network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality Significant improvements in video compression capability have been demonstrated with the introduction of the H.264/MPEG-4 advanced video coding (AVC) standard. Since developing the standard, the joint video team of the ITU-T Video Coding Experts Group (VCEG) and the International Organization for Standardization (ISO)/International Electrotechnical Commission (IEC) Moving Picture Experts Group (MPEG) has also standardized an extension of AVC that is referred to as multiview video coding (MVC). MVC provides a compact representation for multiple views of the video scene, such as multiple synchronized video cameras.

In stereoscopic 3-D video applications, two views are displayed. One for the left eye and one for the right eye. There are various ways of formatting the views of stereoscopic 3-D video content. In one embodiment, the encoding of stereo-paired 3-D video may be a special case of MVC, where left and right eye views are produced via MVC. Other encoding formats of producing 3-D video content are also possible. Various devices may have different capabilities with respect to decoding and rendering these different formats. Embodiments described herein provide for various parameters of a device capability exchange that may facilitate delivery and viewing of the 3-D video content in a communication network such as a wireless network, e.g., an evolved universal terrestrial radio access network (EUTRAN).

Figure 1:
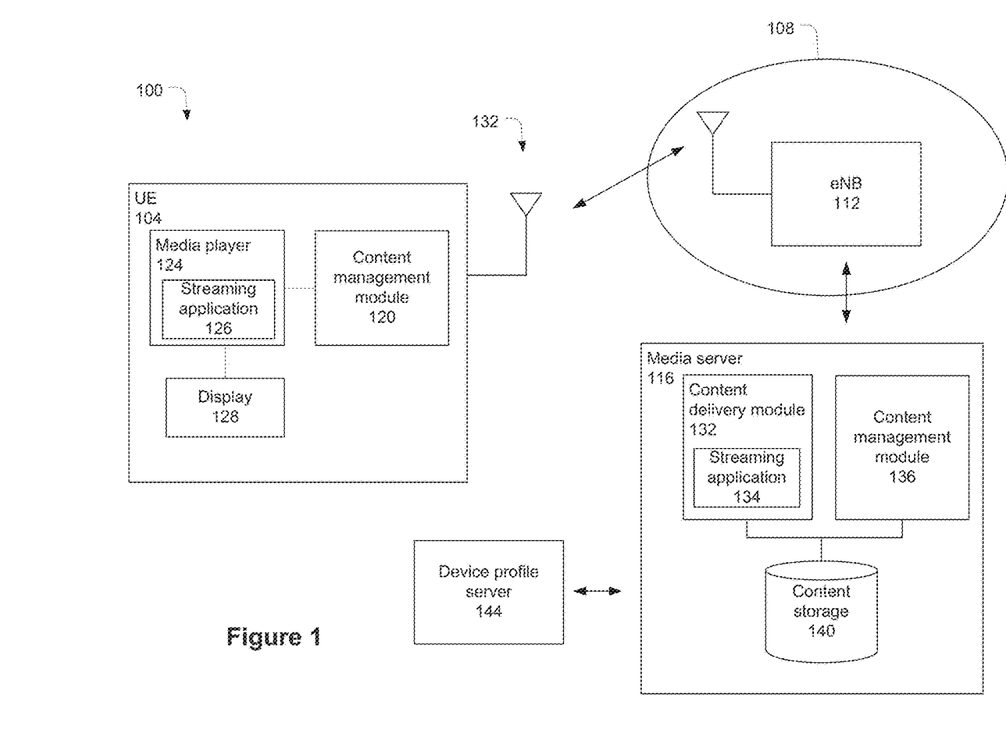

FIG. 1 schematically illustrates a network environment 100 in accordance with various embodiments. The network environment 100 includes a user equipment (UE) 104, which may also be referred to as a client terminal or mobile device, wirelessly coupled with a radio access network (RAN) 108. The RAN 108 may include an enhanced node base station (eNB) 112 configured to communicate with the UE 104 via an over-the-air (OTA) interface. The RAN 108 may be part of a third generation partnership project (3GPP) long-term evolution (LTE) advanced network and may be referred to as an EUTRAN. In other embodiments, other radio access network technologies may be utilized.

The UE 104 may communicate with a remote media server 116 through the RAN 108. While the eNB 112 is shown communicating directly with the media server, it will be understood that the communications may flow through a number of intermediate networking components, e.g., switches, routers, gateways, etc., in various embodiments. For example, in some embodiments, the RAN 108 may be coupled with a core services network (CSN) that communicatively couples the RAN 108 with a larger network, e.g., a wide area network, of which the media server 116 may be considered a part.

While FIG. 1 describes the network environment as a wireless communication network, other embodiments may be used in other types of networks, e.g., wire-line networks. It may be understood that other network environments in which embodiments of the present invention may be employed may include additional, fewer, or different components than those explicitly shown in the example depicted in FIG. 1. For example, embodiments of the present invention employed in a wire-line network, may have the media server 116 and the UE 104 communicating with one another without the RAN 108.

The UE 104 and media server 116 may have a number of components that are configured to facilitate access, storage, transmission, and display of 3-D video content. For example, the UE 104 may include a content management module 120, a media player 124 having a streaming application 126, and a display 128. The streaming application 126 may have sufficient functionality to receive 3-D video content and associated information; decode, unpack, and otherwise re-assemble the 3-D video; and render the 3-D video on the display 128. In various embodiments, the streaming application 126 may be referred to in the context of the streaming technology employed. For example, in embodiments in which the content is streamed by a packet-switched streaming service (PSS), the streaming application 126 may be referred to as a PSS application. The content management module 120 may negotiate or otherwise communicate streaming parameters including, e.g., device capability parameters, to enable receipt of the data in manner that facilitates operation of the media player 124.

The media server 116 may include content delivery module 132 having a streaming application 134, a content management module 136, and a content storage 140. The content delivery module 132 may encode, pack, or otherwise assemble 3-D video content, stored in the content storage 140, for transmission to one or more UEs, e.g., UE 104. The content management module 136 may negotiate or otherwise communicate streaming parameters including, e.g., device capability parameters, and control the content delivery module 132 in a manner to facilitate delivery of the 3-D content.

In some embodiments, one or more of the components that are shown as being part of the media server 116 may be disposed separately from the media server 116 and communicatively coupled with the media server over a communication link. For example, in some embodiments, content storage 140 may be disposed remotely from the content delivery module 132 and the content management module 136.

In some embodiments, the content delivery module 132 may deliver, through eNB 112 in one example, the 3-D video content to the UE 104 in accordance with a 3GPP streaming standard. For example, the 3-D video content may be transmitted in accordance with a PSS standard, e.g., 3GPP TS 26.234 V11.0.0 (Mar. 16, 2012), a dynamic adaptive streaming over HTTP (DASH) standard, e.g., 3GPP TS 26.247 V.11.0.0 (Mar. 16, 2012), a multimedia broadcast and multicast service (MBMS) standard, e.g., TS 26.346 V11.1.0 (Jun. 29, 2012), and/or an IMS-based PSS and MBMS services (IMS_PSS_MBMS) standard, e.g., TS 26.237 V.11.0.0 (Jun. 29, 2012). The streaming application 126 may be configured to receive the 3-D video content over any of a number of transport protocols, e.g., real-time transport protocol (RTP), hypertext transport protocol (HTTP), etc.

Capability exchange enables media streaming servers, such as media server 116, to provide a wide range of devices with video content suitable for the particular device in question. To facilitate server-side content negotiation for streaming, the media server 116 may determine the specific capabilities of the UE 104.

The content management module 120 and the content management module 136 may negotiate or otherwise communicate parameters of a 3-D video content streaming session. This negotiation may take place through session-level signaling via the RAN 108. In some embodiments, the session-level signaling may include transmissions related to device capability information that includes stereoscopic 3-D video decoding and rendering capabilities of the media player 124. In various embodiments, the device capability information may further include pre-decoder buffer size, initial buffering, decoder capability, display properties (screen size, resolution, bit depth, etc.), streaming method (real-time streaming protocol (RTSP), HTTP, etc.) adaptation support, quality of experience (QoE) support, extended real-time transport protocol (RTCP) reporting support, fast content switching support, supported RTP profiles, session description protocol (SDP) attributes, etc.

During the setup of the streaming session, the content management module 136 may use the device capability information to control the content delivery module 132 in a manner to provide the UE 104 with the proper type of multimedia content. For example, the media server 116 may determine which variants of multiple available variants of a video stream are desired based on the actual capabilities of the UE 104 to determine the best-suited streams for that terminal. This may allow for improved delivery of 3-D video content and associated session description and metadata files, for example SDP file or a media presentation description (MPD) file, to the UE 104.

The content delivery module 132 may access the content in the content storage 140 and adapt the content and/or associated session description and metadata files, e.g., SDP/MPD files, according to the negotiated session parameters prior to delivery of the content/associated files. The content, when delivered to the UE 104, may be decoded by the media player 124 and rendered on the display 128.

Figure 2A:
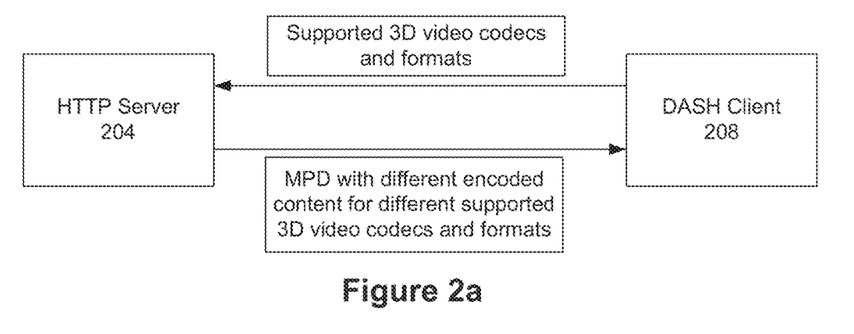
Figure 2B:
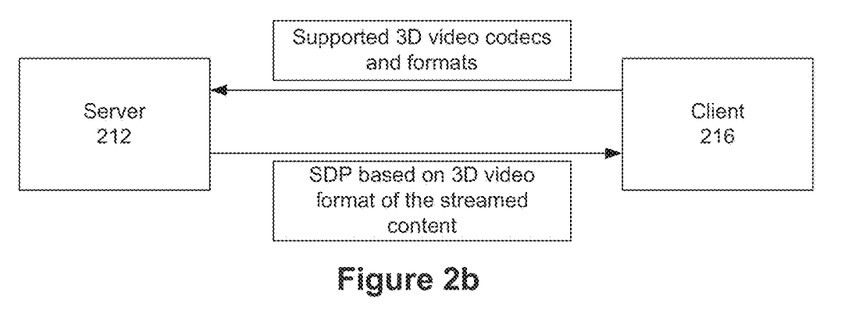
Figure 3:
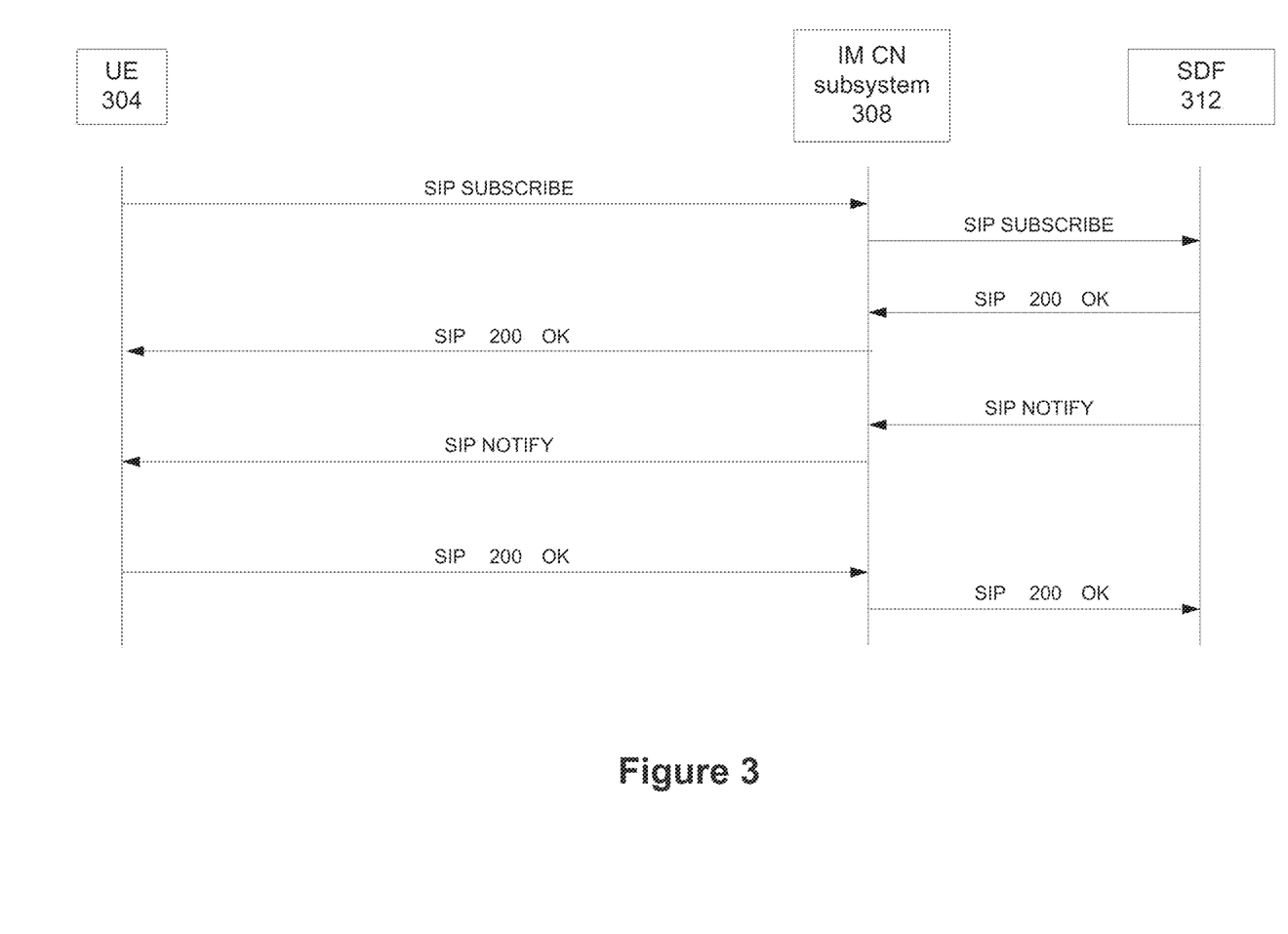
Figure 4:
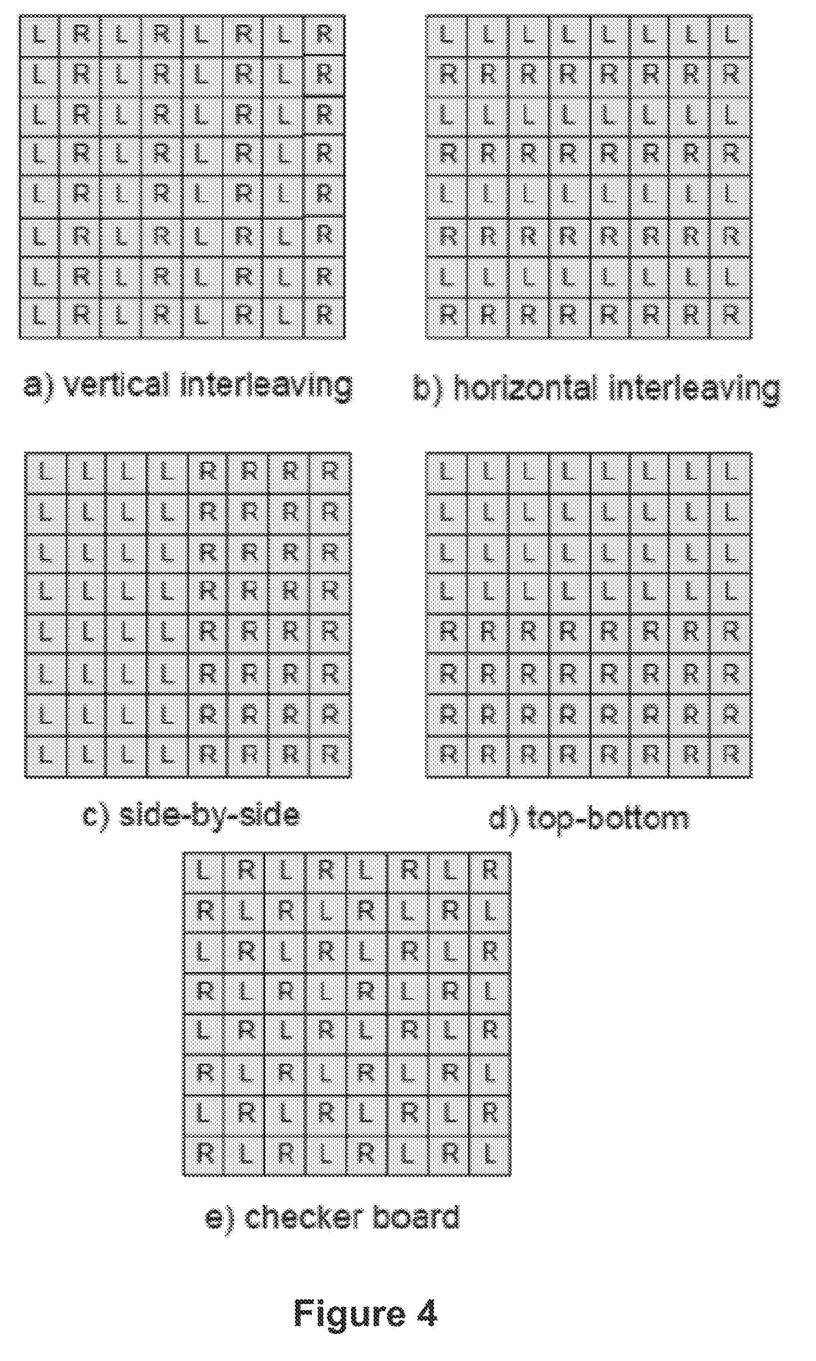

Adaptation of content and/or associated session description and metadata files is shown in accordance with some specific examples with reference to FIGS. 2*a-b*, while setup of streaming session is shown in accordance with a specific example with reference to FIG. 3.

FIG. 2*a* illustrates a DASH-based streaming embodiment with adaptation of 3-D video formats in accordance with some embodiments. In particular, FIG. 2*a* illustrates an HTTP server 204 in communication with a DASH client 208 and implementing a pull-based streaming embodiment, in which the streaming control is maintained by the client rather than the server, where the client downloads content from the server through a series of HTTP-based request-response transactions after the inspection of the MPD. In DASH-based streaming, the MPD metadata file provides information on the structure and different versions of the media content representations stored in the HTTP server 204 (including different bitrates, frame rates, resolutions, codec types, etc.). Based on this MPD metadata information that describes the relation of the segments and how they form a media presentation, DASH client 208 may request the media segments using HTTP GET or partial GET methods. The HTTP server 204 and DASH client 208 may be similar to and substantially interchangeable with media server 116 and UE 104, respectively.

In DASH, the set of 3-D video formats and corresponding content information may be signaled to the DASH client 208 in the MPD. Depending on the capability profile of the DASH client 208 and its supported 3-D formats, the HTTP server 204 may offer different formatted content, e.g., the HTTP server 204 may exclude the 3-D formats that are not supported by the DASH client 208 in the MPD and only include those that are supported by the DASH client 208. In this context, the HTTP server 204 may provide the content optimized for different 3-D video formats to the DASH client 208. In doing this, the HTTP server 204 may use the device capability exchange signaling from the DASH client 208 describing the various supported 3-D video formats. The DASH client 208 may then request the corresponding versions of the 3-D video content supported by the DASH client 208. Moreover, when retrieving an MPD with HTTP, the DASH client 208 may include 3-D video codec and format information in a GET request, including any temporary adjustments to the 3-D video formats based on profile difference (ProfDiff). In an example, the difference may be configured to temporarily modify one or more MPD parameters for a content presentation session. For example, the difference may be configured to modify the MPD until the content presentation session ends or a subsequent difference (corresponding to the first communicated difference) is communicated to the HTTP server 204. This way the HTTP server 204 may deliver an optimized MPD to the DASH client 208.

FIG. 2*b* illustrates an RTSP-based streaming embodiment with adaptation of 3-D video formats in accordance with some embodiments. In particular, FIG. 2*b* illustrates a server 212 and a client 216 implementing a push-based streaming method, in which the streaming and session control are maintained by the server 212 rather than the client 216. The server 212 and client 216 may be similar to and substantially interchangeable with media server 116 and UE 104, respectively.

Examples of push-based streaming include PSS and IMS_PSS_MBMS services based on the RTSP and session initiation protocol (SIP), respectively. In this context, the server 212 receives the set of supported 3-D video codecs and formats from the client 216 and adapts the content based on this information, e.g., the server 212 selects the most suited content version among stored content versions or dynamically transcodes the content based on the supported 3-D video formats and streams the content to the client 216. The session-related metadata carried in the SDP may carry the 3-D video format information for the streamed content.

FIG. 3 illustrates a service discovery with subscribe/notify for IMS_PSS_MBMS service in accordance with some embodiments. In particular, FIG. 3 illustrates interactions between a UE 304, an IP Multimedia (IM) Core Network (CN) subsystem 308, and a service discovery function (SDF) 312. The UE 304 may be similar to and substantially interchangeable with UE 104. The IM CN subsystem 308 and the SDF 312 may be part of a core network domain that interfaces with the access network domain, e.g., the RAN 108.

In the IMS_PSS_MBMS service, the UE 304 can send device capability information, e.g., supported 3-D video codecs and formats, in a SIP SUBSCRIBE message to the IM CN Subsystem 308 during service discovery. The IM CN subsystem 308 may then forward the message to the SDF 312. The SDF 312 determines the proper service discovery information, e.g. according to the capabilities of the UE 304 as described in the user's profile (Personalized Service Discovery). The SDF 312 may then send a SIP 200 OK message to the IM CN subsystem 308, which is relayed to the UE 304 to confirm the session initialization based on the sent device capability information that also includes the supported 3-D video codecs and formats. Afterward, the SDF 312 may send a SIP NOTIFY message, with service discovery information, to the IM CN subsystem 308, which relays the SIP NOTIFY message back to the UE 304. The UE 304 may then respond by sending a SIP 200 OK message to the IM CN subsystem 308, which is then relayed to the SDF 312.

Such a framework enables optimized service discovery utilizing the supported 3-D video formats in IMS-based PSS and MBMS user services. Later during the IMS session, the UE 304 may also use SIP signaling to indicate updates including any temporary adjustments to the set of supported 3-D video codecs and formats based on ProfDiff (e.g., if the current device orientation is different from the default device orientation). This may be done by refreshing the subscription through further SIP SUBSCRIBE messages including information on the updates to the 3-D video format information.

Referring again to FIG. 1, in some embodiments, the media server 116 may be coupled with a device profile server 144 that has profile information of the UE 104. The profile information may include some or all of the device capability information. In such embodiments, the media server 116 may receive identification information from the UE 104 and then retrieve the profile information from the device profile server 144. This may be done as part of the session-level signaling.

In some embodiments, the UE 104 may supplement the profile information retrieved from the device profile server 144 with extra attributes or overrides for attributes already defined in its device capability profile, based on ProfDiff signaling. In one example, such a temporary adjustment may be triggered by user preferences, for example if the user for a particular session only would like to receive two-dimensional (2-D) video even though the terminal is capable of rendering 3-D video.

The streaming application 134 may encode the 3-D video content for transmission in the network environment 100 in accordance with a number of different stream types, with each stream type having associated frame types. Frame types could include frame packing, simulcast, or 2-D plus auxiliary frame types.

Frame packing may include frame-compatible packing formats and full-resolution per view (FRPV) packing format. In frame-compatible packet formats, the streaming application 134 may spatially pack constituent frames of a stereo pair into a single frame and encode the single frame. Output frames produced by the streaming application 126 contain constituent frames of a stereo pair. The spatial resolution of the original frames of each view and the packaged single frame may be the same. In this case, the streaming application 134 may down-sample the two constituent frames before the packing operation. The frame-compatible packing formats may use a vertical interleaving, horizontal interleaving, side-by-side, top-bottom, or checkerboard format as illustrated in FIGS. 4a-e, respectively, and the down sampling may be performed accordingly.

In some embodiments, the streaming application 134 may indicate the frame-packing format that was used by including one or more frame packing arrangement supplemental enhancement information (SEI) messages as specified in the H.264/AVC standard into the bitstream. The streaming application 126 may decode the frame, unpack the two constituent frames from the output frames of the decoder, up sample the frames to revert the encoder side down sampling process, and render the constituent frames on the display 128.

A FRPV packing format may include temporal interleaving. In temporal interleaving, the 3-D video may be encoded at double the frame rate of the original video with each parent and subsequent pictures constituting a stereo pair (left and right view). The rendering of the time interleaved stereoscopic video may typically be performed at a high frame rate, where active (shutter) glasses are used to blend the incorrect view in each eye. This may rely on accurate synchronization between the glasses and the screen.

In embodiments using simulcast frame types, the left and the right views may be transmitted in separate, simulcast streams. The separately transmitted streams may be combined by the streaming application 126 and jointly decoded.

In embodiments using 2-D plus auxiliary frame types, 2-D video content may be sent by the streaming application 134 in conjunction with auxiliary information that may be used by the streaming application 126 to render 3-D video on the display 128. This auxiliary information may be, e.g., a depth/parallax map that is a 2-D map with each pixel defining a depth/parallax of one or more pixels in an associated 2-D video frame.

In some embodiments, other frame types may be used. For example, in some embodiments the streaming application 134 may be capable of encoding stereoscopic views into a base view stream and a non-base view stream, which may be transmitted in the same or different streams. In some embodiments, this may be referred to as MVC-based for stereoscopic video. The non-base view stream may include inter-view prediction frames that provide spatial/temporal predictive information. The base view stream may be sufficient for a single-view, e.g., 2-D, decoder to render the base view as 2-D video, while the non-base view stream may provide 3-D decoders, e.g., streaming application 126, with sufficient information to render 3-D video. If the media server 116 is aware of UEs' capabilities, it can omit sending the non-base view stream to a device that does not support 3-D video or does not have sufficient bitrate to support 3-D video.

In various embodiments, the device capability information, transmitted from content management module 120 and/or device profile server 144 to content management module 136, may include a 3-D format attribute that includes a list of one or more formats relevant for streaming of stereoscopic 3-D video over relevant transmission protocol, e.g., RTP or HTTP, supported by the streaming application 126. In some embodiments, the 3-D format attribute may be a streaming frame packing format for RTP or HTTP having an integer value "1" for vertical interleaving, "2" for horizontal interleaving, "3" for side-by-side, "4" for top-bottom, "0" for checkerboard, or "5" for temporal interleaving. In some embodiments, the same 3-D format attributes may be used to indicate frame packing formats supported in a specific file or container format. In some embodiments, the 3-D format attribute may include a more generalized value, e.g., "FP" for frame packing.

In some embodiments, the 3-D format attribute may be another streaming format having a value "SC" for simulcast or "2DA" for 2-D video plus auxiliary information.

In embodiments in which the UE 104 supports more than one format type, it may further indicate one or more preferred format types. This could be done by listing the format types in an order of preference, associating a preference indicator with select format types, etc.

In some embodiments, in addition to providing a frame type attribute, the content management module 120 and/or the device profile server 144 may provide one or more component type attributes. The component type attributes may provide additional details about specific types of video components, which are constituent elements of the stereoscopic 3-D video, supported and/or preferred by the streaming application 126.

The component type attributes may have a value "C" for indicating a center-view stream, "CD" for indicating a center-view stream and a depth map, "CP" for indicating a center-view stream and a parallax map, "D" for indicating a depth map, "P" for indicating a parallax map, "L" for indicating a left-view stream, "LD" for indicating a left-view stream and a depth map, "LIL" for indicating video frames that include alternating scan lines from the left and right views, "LP" for indicating a left-view stream and a parallax map, "R" for indicating a right-view stream, "Seq" to indicate frame sequential (e.g., video stream that includes alternating frames from the left and right streams—additional signaling, e.g., AVC SEI messages, may be needed to signal which frames contain left and right views), "SbS" for indicating side-by-side, and "TaB" for indicating top and bottom.

Each format type attribute may be associated with a respective set of component type attributes. For example, if the format type is SC, the associated component type may be L or R to indicate left and right views, respectively.

The device capability exchange signaling capability in the PSS specification 3GPP TS 24.234 enables servers to provide a wide range of devices with content suitable for the particular device in question. In order to improve delivery of stereoscopic 3-D video content to the client terminal, the present disclosure describes a new set of attributes that may be included in the PSS vocabulary for device capability exchange signaling. These proposed attributes may describe the 3-D video decoding and rendering capabilities of the client terminal, including which 3-D video frame packing formats the client supports. This may for example allow the server and network to provide an optimized RTSP SDP or DASH MPD to the client terminal, as well as to perform the appropriate transcoding and 3-D format conversions in order to match the transmitted 3-D video content to the capabilities of the client device.

The device capability exchange signaling of supported 3-D video codecs and formats may be enabled in 3GPP TS 26.234 with the inclusion of three new attributes in the PSS vocabulary: (1) for Streaming component, two attributes indicating the list of supported frame packing formats relevant for streaming of stereoscopic 3-D video over RTP and HTTP, respectively, and (2) for ThreeGPFileFormat component, one attribute indicating the list of supported frame packing formats relevant for stereoscopic 3-D video that can be included in a 3GPP file format (3GP) file, which is a multimedia container format commonly used for 3GPP-based multimedia services. The details of the attribute definitions are presented below in accordance with some embodiments.

Attribute Name: StreamingFramePackingFormatsRTP

Attribute definition: List of supported frame packing formats relevant for streaming of stereoscopic 3-D video over RTP supported by the PSS application. The frame packing formats within scope for stereoscopic 3-D video include:

Frame Compatible Packing Formats: 1=Vertical interleaving, 2=Horizontal interleaving. 3=Side-by-Side, 4=Top-Bottom, 0=Checkerboard Full-Resolution per View Packing Formats: 5=Temporal Interleaving Component: Streaming Type: Literal (Bag)

Legal values: List of integer values corresponding to the supported frame packing formats.

Resolution rule: Append

EXAMPLE

```
<StreamingFramePackingFormatsRTP>
    <rdf:Bag>
        <rdf:li>3</rdf:li>
        <rdf:li>4</rdf:li>
    </rdf:Bag>
</StreamingFramePackingFormatsRTP>
```

Attribute Name: StreamingFramePackingFormatsHTTP

Attribute definition: List of supported frame packing formats relevant for streaming of stereoscopic 3-D video over HTTP supported by the PSS application. The frame packing formats within scope for stereoscopic 3-D video include:

Frame Compatible Packing Formats: 1=Vertical interleaving, 2=Horizontal interleaving. 3=Side-by-Side, 4=Top-Bottom, 0=Checkerboard Full-Resolution per View Packing Formats: 5=Temporal Interleaving Component: Streaming Type: Literal (Bag)

Legal values: List of integer values corresponding to the supported frame packing formats.

Resolution rule: Append

EXAMPLE

```
<StreamingFramePackingFormatsHTTP>
    <rdf:Bag>
        <rdf:li>3</rdf:li>
        <rdf:li>4</rdf:li>
    </rdf:Bag>
</StreamingFramePackingFormatsHTTP>
```

Attribute Name: ThreeGPFramePackingFormats

Attribute definition: List of supported frame packing formats relevant for stereoscopic 3-D video that can be included in a 3GP file and handled by the PSS application.

Component: ThreeGPFileFormat

Type: Literal (Bag)

Legal values: List of integer values corresponding to the supported frame packing formats. Integer values shall be either 3 or 4 corresponding to the Side-by-Side and Top-and-Bottom frame packing formats respectively.

Resolution rule: Append

EXAMPLE

```
<ThreeGPFramePackingFormats>
    <rdf:Bag>
        <rdf:li>3</rdf:li>
        <rdf:li>4</rdf:li>
    </rdf:Bag>
</ThreeGPFramePackingFormats>
```

In some embodiments, a media presentation, as described in MPD, for example, may include attributes and elements common to Adaptation Set, Representation, and SubRepresentation. One such common element may be a FramePacking element. A FramePacking element may specify frame packing arrangement information of the video media component type. When no FramePacking element is provided for a video component, frame-packing may not be used for the video media component.

The FramePacking element may include an @schemeIdUri attribute that includes a uniform resource indicator (URI) to identify the frame packing configuration scheme employed. In some embodiments, the FramePacking element may further include an @value attribute to provide a value for the descriptor element.

In some embodiments, multiple FramePacking elements may be present. If so, each element may contain sufficient information to select or reject the described representation.

If the scheme or the value of all FramePacking elements are not recognized, the client may ignore the described Representations. A client may reject the Adaptation Set on the basis of observing a FramePacking element.

For Adaptation Sets or Representations that contain a video component that conforms to ISO/IEC Information technology—Coding of audio-visual objects—Part 10: Advanced Video Coding (ISO/IEC 14496-10:2012), a uniform resource number for FramePackin@schemeIdUri may be urn:mpeg:dash:14496:10:frame_packing_arrangement_type:2011, that may be defined to indicate the frame-packing arrangement as defined by Table D-8 of the ISO/IEC 14496-10:2012 ('Definition of frame_packing arrangement type') to be contained in the FramePacking element. The @value may be the 'Value' column as specified in Table D-8 of the ISO/IEC 14496-10:2012 and may be interpreted according to the 'Interpretation' column in the same table.

Figure 5:
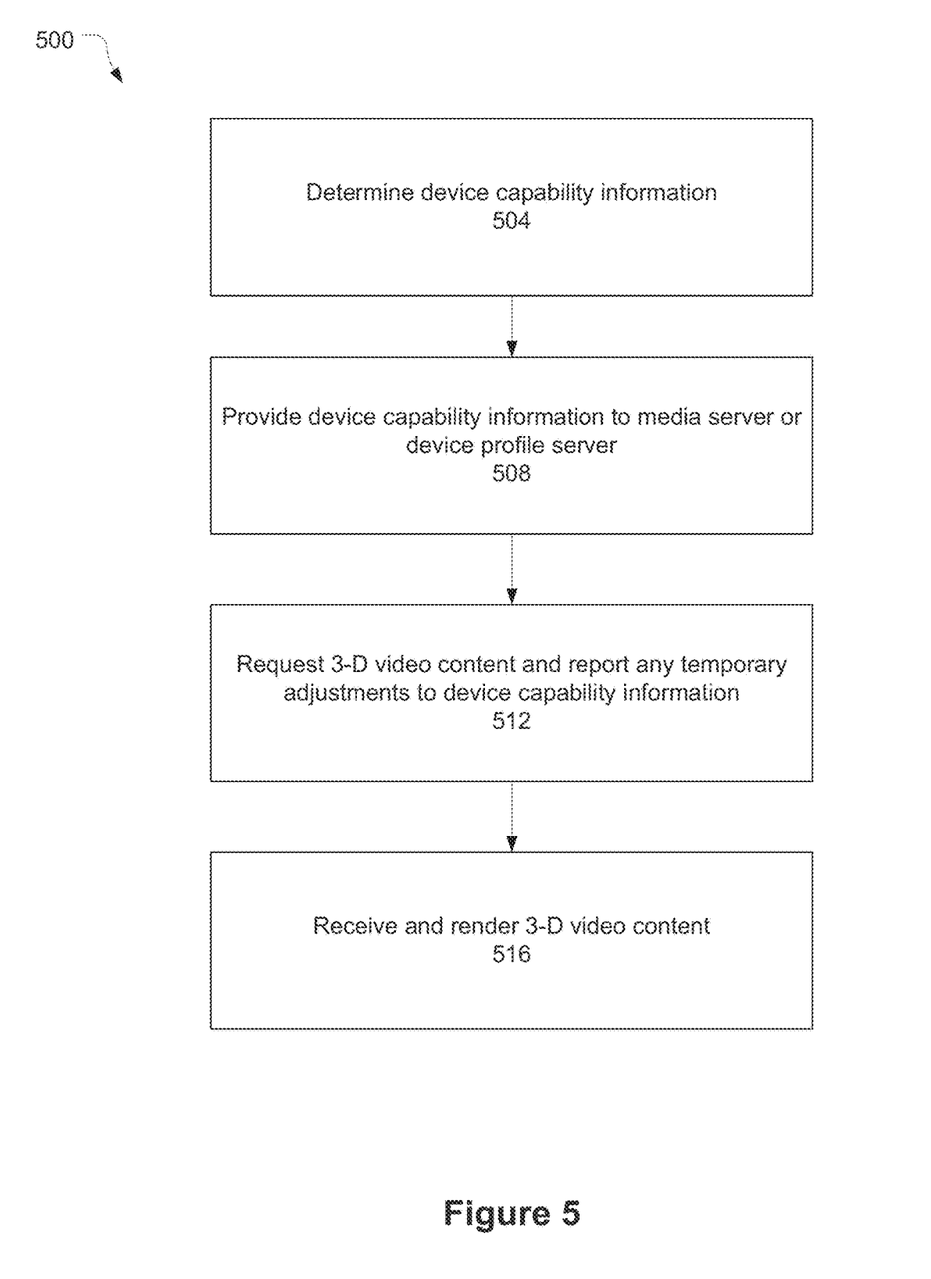

FIG. 5 illustrates a method 500 of signaling 3-D video device capabilities in accordance with some embodiments. Method 500 may be performed by components of a UE, e.g., UE 104. In some embodiments, the UE may include and/or have access to one or more computer-readable media having instructions stored thereon, that, when executed, cause the UE, or components thereof, to perform the method 500.

At 504, the UE may determine device capability information. As described above, the device capability information may include information as to the decoding and rendering capabilities of a media player. In some embodiments, a content management module, located on the UE or elsewhere, may determine this information by running one or more scripts on the UE to directly test the capabilities. In other embodiments, the content management module may access one or more stored files that contain the relevant information.

At 508, the UE may provide device capability information to the media server 116 or device profile server 144, including stereoscopic 3-D video decoding and rendering capabilities of the media player at the UE. As described above, the device capability information may include one or more format type attributes that represent a list of frame types supported by a streaming application of the UE. In some embodiments, the device capability information may be provided prior to or after the request at 512.

In some embodiments, some or all of the device capability information may be provided to the media server by another entity, e.g., a device profile server.

At 512, the UE may request 3-D video content. In some embodiments, the request may be in accordance with appropriate streaming/transport protocols, e.g., HTTP, RTP, RTSP, DASH, MBMS, PSS, IMS_PSS_MBMS, etc. The request may be directed to the media server and may include a uniform resource locator (URL) or some other indicator of the requested content or portions thereof. In some embodiments, the temporary adjustment to device capability information (e.g., via ProfDiff signaling) may also be provided along with the request at 508. Accordingly, the UE may supplement the profile information retrieved from the device profile server with extra attributes or overrides for attributes already defined in its device capability profile, based on ProfDiff signaling. In one example, such a temporary adjustment may be triggered by user preferences, for example if the user for a particular session only would like to receive two-dimensional (2-D) video even though the terminal is capable of rendering 3-D video.

At 516, the UE may receive the requested 3-D video content and render the content on a display of the UE. The rendering of the content may include a variety of processes such as, but not limited to, decoding, upconverting, unpacking, sequencing, etc.

Figure 6:
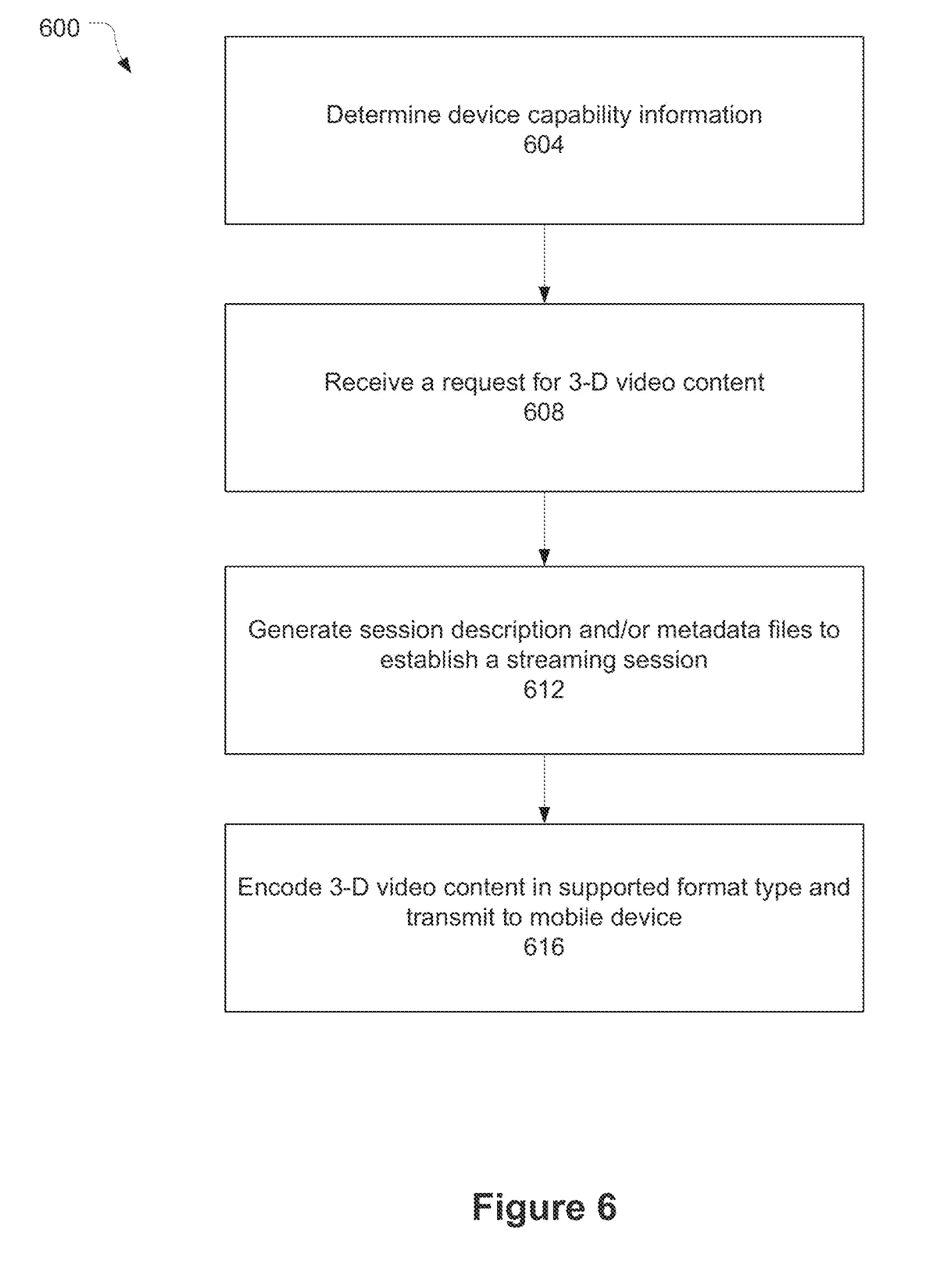

FIG. 6 illustrates a method 600 of signaling 3-D video content in accordance with some embodiments. Method 600 may be performed by components of a media server, e.g., media server 116. In some embodiments, the media server may include and/or have access to one or more computer-readable media having instructions stored thereon, that, when executed, cause the media server, or components thereof, to perform the method 600.

At 604, the media server may determine device capability information. In some embodiments, the media server may determine the device capability information by receiving, e.g., as part of session-level signaling, the information from the UE or a device profile server.

At 608, the media server may receive a request for 3-D video content. In some embodiments, the request may be in accordance with appropriate streaming/transport protocols, e.g., HTTP, RTP, RTSP, DASH, MBMS, PSS, IMS_PSS_MBMS, etc. The request may be from the UE and may include a universal resource locator (URL) or some other indicator of the requested content or portions thereof. In some embodiments, the request received at 608 may occur simultaneously with determination of the device capability information 604, before the determination, or after the determination. In some embodiments, the temporary adjustment to device capability information (e.g., via ProfDiff signaling) may also be received along with the request at 608. Accordingly, the media server may be supplemented with the profile information retrieved from the device profile server with extra attributes or overrides for attributes already defined in its device capability profile, based on ProfDiff signaling.

At 612, the media server may generate session description and/or metadata files to establish a streaming session, for example SDP file or a media presentation description (MPD) based on the device capability information accounting for the stereoscopic 3-D video decoding and rendering capabilities of the media player at the UE.

At 616, the media server may encode the 3-D video content in a format type indicated as being supported by the UE in the device capability information. The 3-D video content may then be streamed to the mobile device.

Figure 7:
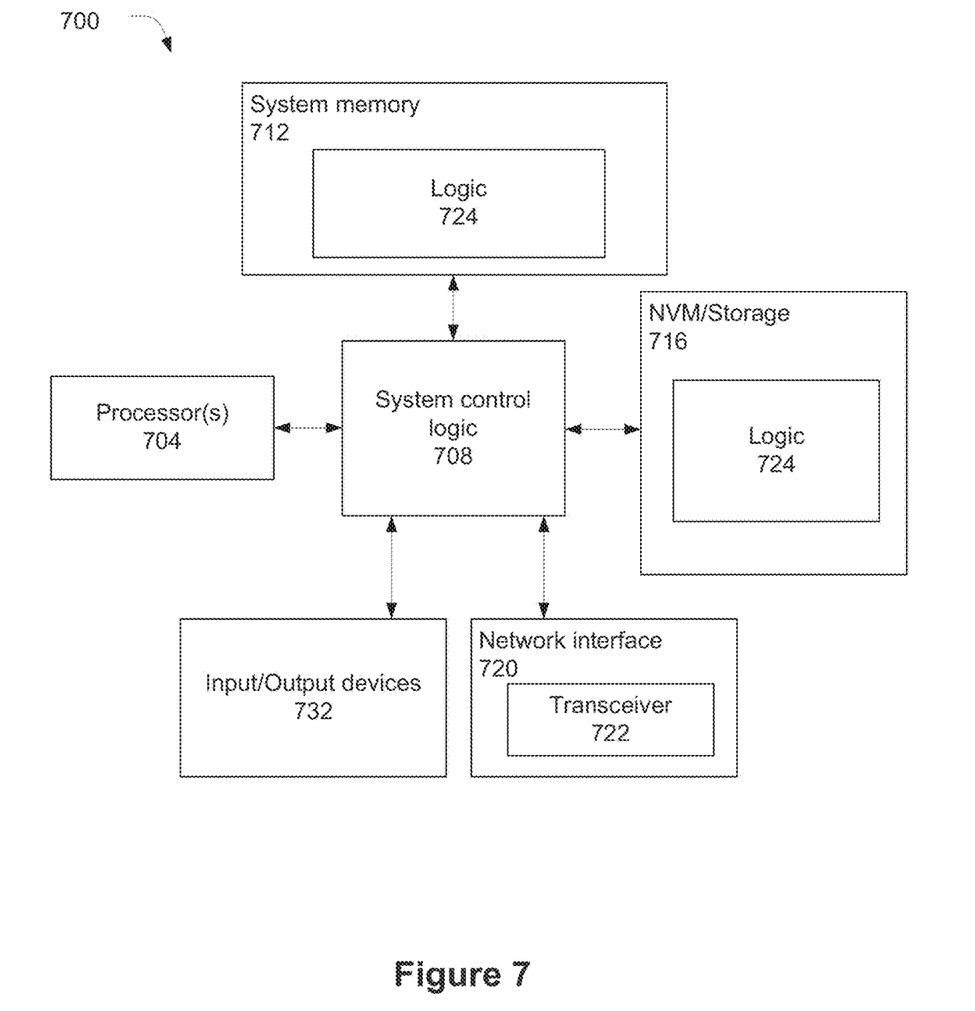

The components described herein, e.g., UE 104, media server 116, and/or device profile server 144, may be implemented into a system using any suitable hardware and/or software to configure as desired. FIG. 7 illustrates, for one embodiment, an example system 700 comprising one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, and input/output (I/O) devices 732 coupled with system control logic 708.

The processor(s) 704 may include one or more single-core or multi-core processors. The processor(s) 704 may include any combination of general-purpose processors and dedicated processors (e.g., graphics processors, application processors, baseband processors, etc.).

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, e.g., logic 724. System memory 712 for one embodiment may include any suitable volatile memory, such as suitable dynamic random access memory (DRAM), for example.

NVM/storage 716 may include one or more tangible, non-transitory computer-readable media used to store data and/or instructions, e.g., logic 724. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720 and/or over Input/Output (I/O) devices 732.

The logic 724, when executed by at least one of the processors 704 may cause the system to perform the operations described herein with respect to the UE 104, media server 116, and/or device profile server 144. The logic 724 may be disposed additionally/alternatively in other components of the system, e.g., in system control logic 708, and may include any combination of hardware, software, or firmware components.

Network interface 720 may have a transceiver 722 to provide a radio interface for system 700 to communicate over one or more network(s) and/or with any other suitable device. In various embodiments, the transceiver 722 may be integrated with other components of system 700. For example, the transceiver 722 may include a processor of the processor(s) 704, memory of the system memory 712, and NVM/Storage of NVM/Storage 716. Network interface 720 may include any suitable hardware and/or firmware. Network interface 720 may include a plurality of antennas to provide a multiple input, multiple output radio interface. Network interface 720 for one embodiment may include, for example, a wired network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, the I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display for rendering 3-D video (e.g., a liquid crystal display, a touch screen display, an auto-stereoscopic display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be a mobile computing device such as, but not limited to, a laptop computing device, a tablet computing device, a netbook, a smartphone, etc. In various embodiments, system 700 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions, stored thereon, that when executed cause a device to:
   obtain a Third Generation Partnership (3GP)-Dynamic Adaptive Streaming over Hypertext Transfer Protocol (DASH) profile associated with a user equipment (UE) of a wireless communication network, the 3GP-DASH profile to indicate one or more restrictions associated with stereoscopic three-dimensional (3-D) video content supported by the UE;
   identify a first media presentation that complies with the obtained 3GP-DASH profile and is available for delivery to the UE;
   obtain a media presentation description (MPD) that includes information associated with the identified first media presentation and information associated with a second media presentation that does not comply with the obtained 3GP-DASH profile;
   modify, based on the obtained 3GP-DASH profile, the MPD to exclude the information associated with the second media presentation that does not comply with the obtained 3GP-DASH profile; and
   transmit the modified MPD to the UE.

2. The one or more media of claim 1, wherein the 3GP-DASH profile is a multiview stereoscopic 3D video profile to indicate that the UE supports multiview stereoscopic 3D video content that includes a base view and a non-base view that are temporally interleaved.

3. The one or more media of claim 1, wherein the 3GP-DASH profile is a frame-packed stereoscopic 3D video profile to indicate that the UE supports frame-packed 3D video content that includes a base view and a non-base view packed in a same frame.

4. The one or more media of claim 3, wherein the instructions, when executed, further cause the device to include a frame packing element in the modified MPD to indicate a type of frame packing format used for DASH delivery of the media presentation.

5. The one or more media of claim 4, wherein the frame packing element indicates that the type of frame packing format used is a vertical interleaving frame compatible packing format, a horizontal interleaving frame compatible packing format, a side-by-side frame compatible packing format, a top-bottom frame compatible packing format, or a checkerboard frame compatible packing format.

6. The one or more media of claim 1, wherein the modified MPD includes one or more attributes associated with individual DASH representations of the first media presentation, wherein the individual DASH representations include DASH representations associated with different time periods of the first media presentation.

7. The one or more media of claim 6, wherein the modified MPD includes attributes associated with DASH representations of the first media presentation that comply with the 3GP-DASH profile and excludes attributes associated with one or more representations of the first media presentation that do not comply with the 3GP-DASH profile.

8. The one or more media of claim 1, wherein the instructions, when executed, further cause the device to:
   obtain a hypertext transfer protocol (HTTP) GET or partial GET request, transmitted by the UE, for a DASH representation associated with the first media presentation; and
   send, in response to the HTTP GET or partial GET request, the DASH representation to the UE.

9. The one or more media of claim 8, wherein DASH representation is sent to the UE via a multimedia broadcast and multicast service (MBMS).

10. The one or more media of claim 1, wherein the 3GP-DASH profile is obtained from a device profile server.

* * * * *